United States Patent [19]

Smith, Jr.

[11] Patent Number: 5,262,012
[45] Date of Patent: Nov. 16, 1993

[54] CATALYTIC DISTILLATION SYSTEM

[75] Inventor: Lawrence A. Smith, Jr., Houston, Tex.

[73] Assignee: Chemical Research & Licensing Company, Pasadena, Tex.

[21] Appl. No.: 584,649

[22] Filed: Sep. 19, 1990

[51] Int. Cl.⁵ .............................. B01D 3/32; B01J 8/02
[52] U.S. Cl. .................... 202/158; 202/266; 203/29; 203/DIG. 6; 261/95; 261/DIG. 72; 422/187; 422/211; 422/212
[58] Field of Search .................. 203/DIG. 6, 29; 202/158, 266; 502/1, 2, 527; 422/211, 212, 190, 192, 193, 187; 261/94, 95, DIG. 72

[56] References Cited

U.S. PATENT DOCUMENTS

| | | | |
|---|---|---|---|
| 3,112,256 | 11/1963 | Young et al. | 422/211 |
| 3,364,656 | 1/1968 | Whiton et al. | 261/DIG. 72 |
| 3,429,654 | 2/1969 | Friedrichsen et al. | 261/DIG. 72 |
| 3,430,934 | 3/1969 | Weishaupt | 261/DIG. 72 |
| 3,506,408 | 4/1970 | Kageyama et al. | 261/DIG. 72 |
| 3,595,626 | 7/1971 | Sowards | 422/211 |
| 3,634,534 | 1/1972 | Haunschild | 260/677 A |
| 3,713,281 | 1/1973 | Asker et al. | 422/211 |
| 4,136,976 | 1/1979 | Leffelman | 261/DIG. 72 |
| 4,215,011 | 7/1980 | Smith, Jr. | 252/426 |
| 4,232,530 | 12/1980 | Smith, Jr. | 585/510 |
| 4,250,052 | 2/1981 | Smith, Jr. | 252/426 |
| 4,289,855 | 9/1981 | Whitley | 422/211 |
| 4,302,356 | 11/1981 | Smith, Jr. | 252/426 |
| 4,307,254 | 12/1981 | Smith, Jr. | 568/697 |
| 4,336,407 | 6/1982 | Smith, Jr. | 568/697 |
| 4,439,350 | 3/1984 | Jones, Jr. | 502/527 |
| 4,443,559 | 4/1984 | Smith, Jr. | 502/527 |
| 4,471,154 | 9/1984 | Franklin | 585/864 |
| 4,482,775 | 11/1984 | Smith, Jr. | 585/671 |
| 4,624,748 | 11/1986 | Haunschild | 203/DIG. 6 |
| 4,847,430 | 7/1989 | Quang et al. | 568/697 |
| 4,847,431 | 7/1989 | Nocca et al. | 568/197 |
| 4,849,569 | 7/1989 | Smith | 203/DIG. 6 |
| 4,918,244 | 4/1990 | Nelson et al. | 568/698 |

FOREIGN PATENT DOCUMENTS

| | | |
|---|---|---|
| 448884A1 | 10/1991 | European Pat. Off. . |
| 2096603 | 10/1982 | United Kingdom . |
| 2096604 | 10/1982 | United Kingdom . |

*Primary Examiner*—Wilbur Bascomb, Jr.
*Attorney, Agent, or Firm*—Kenneth H. Johnson

[57] ABSTRACT

A catalytic distillation system is provided having a first component which is a particulate catalyst useful for carrying out the desired chemical reaction and a second component which is a hollow geometric shape having openings through the outer surface to allow gas and liquid to pass therethrough. The two components are mixed to provide the desired open space and loaded into a distillation column reactor. The hollow geometric shapes provides the spacing, while the openings permit the gas and liquid to flow through, thus providing the requisite vapor liquid contact space and surfaces.

10 Claims, 2 Drawing Sheets

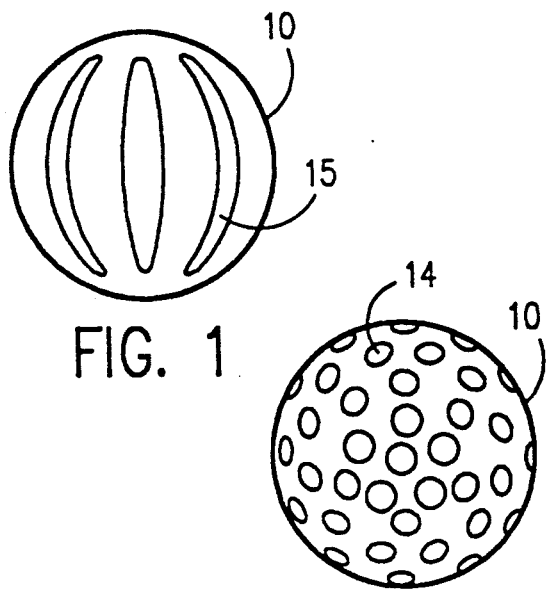
FIG. 1
FIG. 2
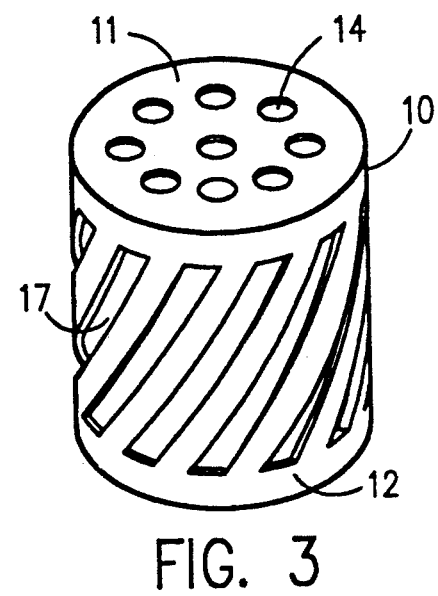
FIG. 3
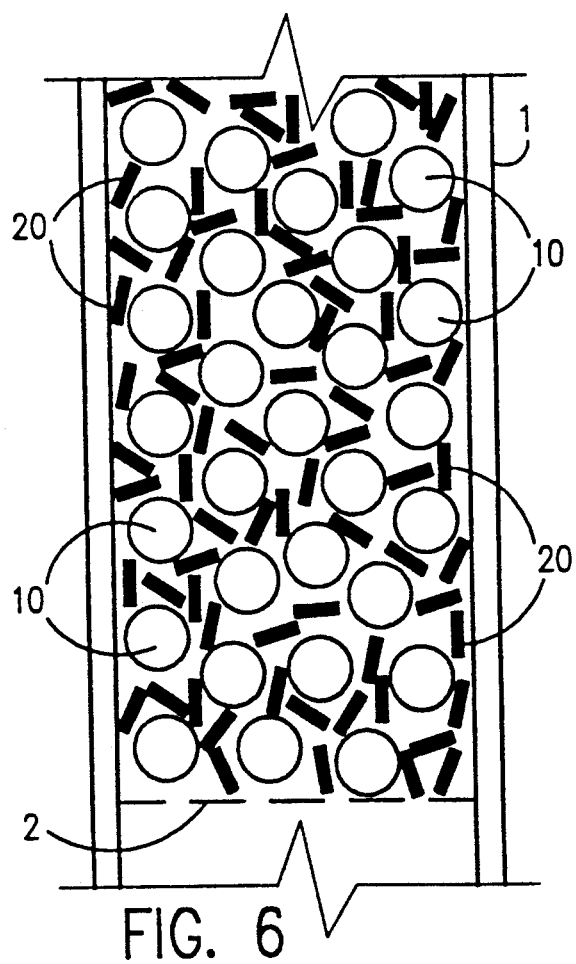
FIG. 6
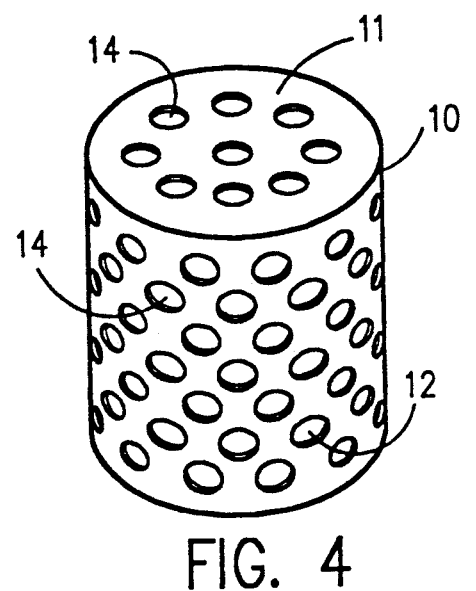
FIG. 4
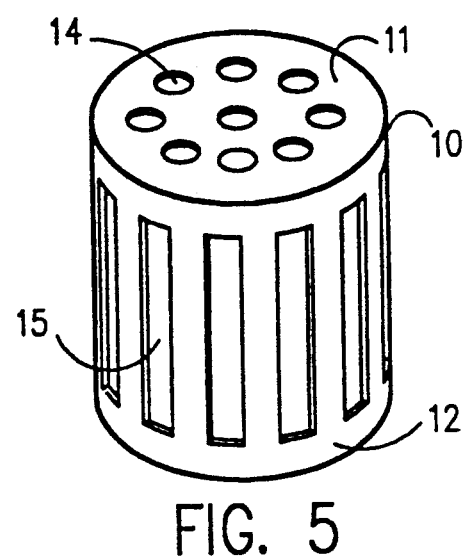
FIG. 5

CATALYTIC DISTILLATION SYSTEM

BACKGROUND OF THE INVENTION

1. Field of the Invention

The present invention relates to a system for concurrently carrying out chemical reactions and separating the reactants and products by fractional distillation. More particularly, the invention relates to a catalytic distillation system in which a particulate catalyst is dispersed in and supported by a bed of hollow geometric shaped particles having openings through the surface.

2. Related Art

A new method of carrying out catalytic reactions has been developed, wherein the components of the reaction mixture are concurrently separable by fractional distillation. Several systems have been proposed and one commercially successful uses the catalyst as the catalytic distillation structure. Such a system is variously described in U.S. Pat. Nos. 4,215,011; 4,232,177; 4,242,530; 4,250,052; 4,302,356; 4,307,254; 4,336,407; 4,439,350; 4,443,559; and 4,482,775 commonly assigned herewith.

Briefly, the commercial structure described therein comprises a cloth belt with a plurality of pockets spaced along the belt and containing particulate catalyst material. The cloth belt with catalyst filled pockets is wound into a helix about a spacing material such as knitted stainless steel wire mesh, and these "bales" loaded into a distillation column. Additionally U.S. Pat. Nos. 4,302,356, 4,443,559 and 4,250,052 disclose a variety of catalyst structures for this use.

Placing the particulate catalyst loose on standard distillation trays has also been proposed. See, for example, U.S. Pat. No. 4,215,011 and U.K. patents GB 2,096,603 and 2,096,604. The placement of the catalyst in the downcomers of standard distillation columns has been proposed as in U.S. Pat. No. 3,634,534. Fluidization of the catalyst on the trays has also been suggested as in U.S. Pat. No. 4,471,154. Some deficiencies of such fluidized beds were recognized in Chemiker Zeitung/Chemische Apparatur, vol. 90, no. 13, July 1966 and U.S. Pat. No. 4,215,011. Quang, et al, in U.S. Pat. No. 4,847,430 and Nocca, et al in U.S. Pat. No. 4,847,431 disclose loading the particulate catalyst on alternating trays of a distillation column and with a gas by pass about the catalyst loaded trays.

The use of solid glass beads to disperse and support a catalyst in a fixed bed has long been used, especially in pilot plants and bench scale reactors. See for example U.S. Pat. No. 4,918,244 wherein glass beads were used as a dispersant and support in a bench scale reactor distillation column.

Additionally the use of containers filled with particulate catalyst has been proposed in commonly assigned patent application Ser. No. 07/526,444 filed May 21, 1990, now U.S. Pat. No. 5,057,468. The container supports and separates the catalyst while providing the distillation surfaces for the distillation.

So far, the most commercially successful arrangement has been to the place the particulate catalyst in closed pockets disposed along a fiber glass cloth belt as disclosed in U.S. Pat. No. 4,215,011.

The main problems sought to be overcome by the improvements have been the reduction of pressure drop through the column and provision of sufficient contact of the reactants with the catalyst while providing for good vapor liquid contact for the fractional distillation. Many useful catalysts are in the form of fine particulate powders which preclude their use directly as distillation components. Even larger extruded pellets do not lend themselves well as distillation structures. Hence the use of cloth belts, cages and support trays is the predominate developmental thrust. While larger catalysts structures have been proposed, the porosity requirements of many catalytic materials limit their structural integrity. Many catalysts which rely on outer surface activity only and which might have the strength for larger structures are useful only for gas phase reactions, such as maleic anhydride production.

SUMMARY OF THE INVENTION

The catalytic distillation system of the present invention is a dual component system. The first component is a particulate catalyst useful for carrying out the desired chemical reaction. The second component is a spacing element which is essentially a hollow geometric shape having openings through the outer surface to allow gas and liquid to pass therethrough. The two components are mixed to provide the desired open space and loaded into a distillation column reactor. The hollow geometric shapes provides the spacing, while the openings permit the gas and liquid to flow through, thus providing the requisite vapor liquid contact space and surfaces.

BRIEF DESCRIPTION OF THE DRAWINGS

FIG. 1 is a depiction of a hollow spherical spacing element having slotted openings through the surface.

FIG. 2 is a depiction of a hollow spherical spacing element having circular openings through the surface.

FIG. 3 is a depiction of a hollow cylindrical spacing element having circular openings though the end surfaces and spiral slotted openings through the side surface.

FIG. 4 is a depiction of a hollow cylindrical spacing element having circular openings through the end and side surfaces.

FIG. 5 is a depiction of a hollow cylindrical spacing element having circular openings through the end surfaces and longitudinal slots through the side surface.

FIG. 6 is a depiction of the embodiment of either FIG. 1 or FIG. 2 as loaded into a distillation column reactor supporting and dispersing an extruded particulate catalyst.

DESCRIPTION OF THE PREFERRED EMBODIMENT

Figure 7:
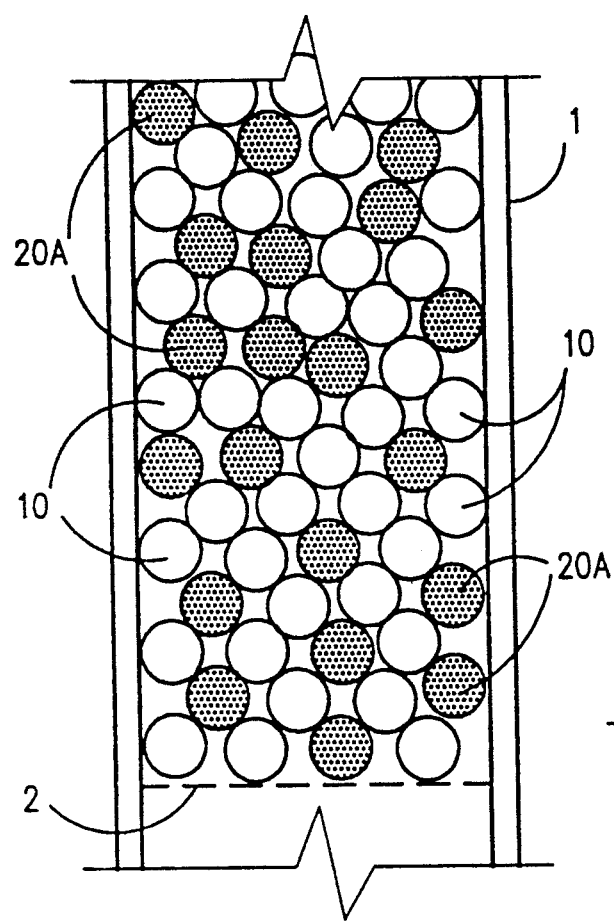
FIG. 7 is a depiction of the embodiment of either FIG. 1 or FIG. 2 as loaded into a distillation column reactor with beaded catalyst particles approximately the same size as the hollow spacing element.

The present invention provides a catalytic distillation system in which particulate catalysts may be used without the special containers heretofore required. In order to provide both catalytic and distillation functions there are three highly desirable criteria. First, the system should be such as to provide for relatively even spatial dispersion in the distillation column reactor. That is, the catalyst system must rest in the column in a geometric arrangement which will perform the desired functions of reaction and distillation sites. To achieve this the system may be such as to provide fairly uniform spatial distribution in the column.

A second criteria is that there be sufficient free space in the catalyst bed to allow for the liquid phase contact and vapor phase distillation with the concurrent separation of the material in the column by the distillation into vapor and liquid phases. It has been observed that in the catalyst bed a free space of about 50 volume percent is adequate to obtain operable fractionation.

A third criteria is for the catalyst bed to be able to expand and contract during use without undue attrition of the catalyst.

These criteria are met by providing a spacing structure which may be used to disperse and support the particulate catalyst. The spacing structures are hollow to provide the necessary free space. The free space provided by the hollow structures is accessed by openings through the surface. This unique structure differs from solid support structures such as ceramic balls or glass beads in that the volume within the structure is accessible to the vapor and liquid.

The particular size and shape of the spacing structures may be selected from any that is convenient for loading or which provides the necessary random free space for the required volume of particulate catalyst. Depending upon the size the spacing structures may be loaded into the distillation column reactor first and the catalyst added, or the two may be mixed and loaded concurrently. However, it is expected that the size of the spacing structures will be substantially smaller than the reactor into which they are loaded, e.g. $1 \times 10^{-7}$ to $7 \times 10^{-5}$ the volume of conventional reactors into which they are placed.

A preferred embodiment for the spacing element is spherical because the loading volume of spheres is more easily predicted. Two versions of the spherical embodiment are shown in FIG. 1 and FIG. 2. In FIG. 1 the spherical spacing element 10 is shown to have slotted openings 15 through the surface. In FIG. 2 the openings are shown to be circular ports 14.

FIGS. 3-5 depict alternative cylindrical spacing elements. The only difference between the spacing elements shown is the type of openings on the ends 11 and side of the cylinder, e.g. circular as shown at 14 in the top of FIGS. 3-5 and sides of FIG. 4, spiral opening 17 as shown in the sides of FIG. 3 or rectangular as shown in the sides of FIG. 5.

The openings in any embodiment are preferably smaller than the particulate catalyst with which the spacing element is used to prevent the catalyst from entering and filling the hollow space. A practical limit to the size of the openings may be the pressure drop caused by the vapor and liquid entering and leaving the hollow element. The particulate catalyst with which the spacing elements are used to make up the catalytic distillation system can be of any convenient size or shape as long as the particles do not enter and fill the free space within the spacing elements. It is anticipated that extruded particulate catalysts of from 1/32 to ½ inch in diameter, such as any of the alumina or alumina supported catalysts, would particularly benefit from the use of the spacing elements. Additionally the spherical catalyst having a diameter of between 1/32 to ½ inch would probably also benefit. FIG. 6 depicts a mixture of spherical spacing elements 10 and extruded particulate catalyst 20 supported within a distillation column reactor 1 by a screen 2.

Figure 8:
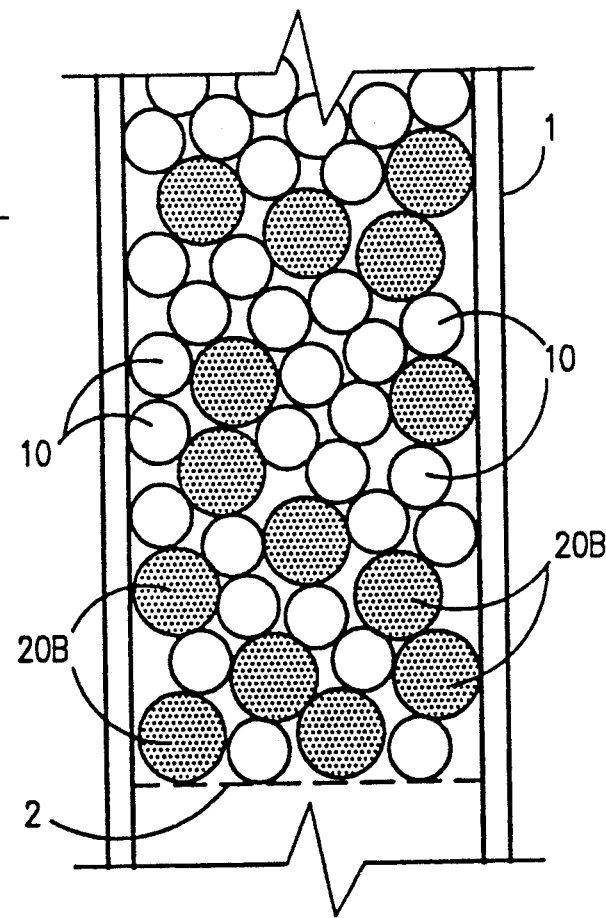
FIG. 8 is a depiction of the embodiment of either FIG. 1 or FIG. 2 as loaded into a distillation column reactor with beaded catalyst particles larger than the spacing elements.

FIG. 7 depicts a mixture of spherical spacing elements 10 and spherical beaded catalysts 20A which are approximately the same size as the spacing elements 10, both being supported within a distillation column reactor 1 by a screen 2. FIG. 8 is similar to FIG. 7 except that the spherical beaded catalyst particles 20B are shown to be larger than the hollow spacing elements 10.

The size of the spacing elements may be larger, smaller or equal to the particulate catalyst depending upon the size of the catalyst particles. The material for the spacing elements is preferably inert and should be rigid to maintain their integrity while being loaded and during operation. Additionally, the materials of construction must be able to withstand the environment within a distillation column reactor. Any of the various grades of stainless steel, ceramics, glass or some of the newer plastics which are available would be suitable depending upon the service.

The invention claim is:

1. A catalytic distillation system for simultaneously carrying out chemical reactions between reactants to produce a reaction mixture of products and unreacted reactants and fractional distillation of the products and reactants, comprising the combination of a distillation column reactor, and a bed comprising a plurality of particulate catalyst particles dispersed among and supported in said catalytic distillation column reactor by a plurality of hollow spacing elements that are intimately commingled throughout said particulate catalyst, each of said hollow spacing elements having openings through the surface thereof and providing a distillation structure necessary for said fractional distillation, said openings being sized to prevent said particulate catalyst particles from entering said hollow spacing elements.

2. The catalytic distillation system of claim 1 wherein said hollow spacing elements are larger than said particles.

3. The catalytic distillation system of claim 1 wherein said hollow spacing elements are substantially the same size as said particles.

4. The catalytic distillation system of claim 1 wherein said hollow spacing elements are smaller than said particles.

5. The catalytic distillation system of claim 1 wherein said hollow spacing elements are spherical in shape.

6. The catalytic distillation system of claim 1 wherein said hollow spacing elements are cylindrical in shape.

7. The catalytic distillation system of claim 1 wherein said particulate catalyst particles comprise extrudates having a diameter of between 1/32 inch to ½ inch.

8. The catalytic distillation system of claim 1 wherein said particulate catalyst particles comprise spherical beads having a diameter of between 1/32 inch to ½ inch.

9. The catalytic distillation system of claim 1 wherein the combined volume within said hollow spacing elements is about 50 per cent of the total volume of said particulate catalyst particles and said hollow spacing elements.

10. A catalytic distillation system comprising:
   (a) a distillation reaction column and
   (b) a bed disposed within said distillation reaction column said bed comprising
      (i) a particulate catalytic component commingled through out
      (ii) a hollow geometric component commingled throughout said particulate catalyst component, said hollow geometric component having openings therethrough over substantially the entire surface thereof, said openings being sized to prevent said particulate catalytic component from entering said hollow geometric component.

* * * * *